United States Patent
Li et al.

(10) Patent No.: US 10,394,245 B2
(45) Date of Patent: Aug. 27, 2019

(54) METHOD AND SYSTEM TO PREDICT VEHICLE TRAFFIC BEHAVIOR FOR AUTONOMOUS VEHICLES TO MAKE DRIVING DECISIONS

(71) Applicant: Baidu USA LLC, Sunnyvale, CA (US)

(72) Inventors: Liyun Li, Sunnyvale, CA (US);
Jinghao Miao, Sunnyvale, CA (US);
Shiyuan Fang, Sunnyvale, CA (US);
I-Hsuan Yang, Sunnyvale, CA (US);
Jingao Wang, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 256 days.

(21) Appl. No.: 15/359,466

(22) Filed: Nov. 22, 2016

(65) Prior Publication Data

US 2018/0143644 A1  May 24, 2018

(51) Int. Cl.
| | | |
|---|---|---|
| *G05D 1/00* | (2006.01) | |
| *G05D 1/02* | (2006.01) | |
| *B60W 50/00* | (2006.01) | |
| *B60W 30/095* | (2012.01) | |
| *G06K 9/00* | (2006.01) | |

(52) U.S. Cl.
CPC ......... *G05D 1/0221* (2013.01); *B60W 30/095* (2013.01); *B60W 50/0097* (2013.01); *G06K 9/00335* (2013.01); *G06K 9/00362* (2013.01); *G06K 9/00791* (2013.01); *B60W 2550/10* (2013.01); *B60W 2550/408* (2013.01); *B60Y 2300/08* (2013.01); *G05D 2201/0213* (2013.01)

(58) Field of Classification Search
USPC .......................................................... 701/27
See application file for complete search history.

(56) References Cited

U.S. PATENT DOCUMENTS

2017/0131719 A1* 5/2017 Micks .................. B60W 40/08

* cited by examiner

*Primary Examiner* — James M McPherson
(74) *Attorney, Agent, or Firm* — Womble Bond Dickinson (US) LLP (57) ABSTRACT

Responsive to sensor data received from one or more sensors of an autonomous vehicle, one or more predicted trajectories are generated, with each of the predicted trajectories having an associated probability. One or more driving scenarios that trigger gesture recognition are identified. For each of the identified driving scenarios, one or more gestures from one or more vehicles are detected in accordance with a gesture detection protocol. One or more gestures from the autonomous vehicle are emitted for communication with the vehicles in accordance with a gesture emission protocol based on the detected gestures. The predicted trajectories are modified based on the detected gestures, the emitted gestures and the associated probabilities of the predicted trajectories. The autonomous vehicle is controlled based on the modified predicted trajectories.

24 Claims, 8 Drawing Sheets

METHOD AND SYSTEM TO PREDICT VEHICLE TRAFFIC BEHAVIOR FOR AUTONOMOUS VEHICLES TO MAKE DRIVING DECISIONS

TECHNICAL FIELD

Embodiments of the present invention relate generally to operating autonomous vehicles. More particularly, embodiments of the invention relate to prediction of vehicle traffic behavior for autonomous vehicles to make driving decisions.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Similar to human beings making various decisions while driving, an autonomous vehicle always has to make instant driving decisions according to the actual surrounding environment, which includes, but is not limited to, a stop-controlled junction or intersection, yield-controlled intersection, etc. Such environment often creates driving difficulties (e.g., a deadlock) as it may be difficult to determine which vehicle, for example, has the right-of-way. Human beings, however, can easily resolve the difficulties by communicating with each other with gestures (e.g., hand motions). Unfortunately, such may be challenging for autonomous vehicles.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, the system emulates communication between human beings and resolve driving difficulties within a driving environment by performing trajectory prediction of one or more vehicles within a driving scenario (e.g., stop sign junction) to produce several predicted trajectories of the vehicles. The system detects or recognizes one or more gestures (e.g., human gestures) from the vehicles and emits one or more gestures for communication with the vehicles based on the detected gestures. The emitted gestures imitate, for example, gestures of a human being. Based on the detected and emitted gestures, the system corrects or modifies the predicted trajectories of the vehicles and effectively makes driving decisions for an autonomous vehicle using the modified trajectories. The modified trajectories determine whether the autonomous vehicle, for example, is to yield to or overtake the vehicles within the driving scenario.

In one embodiment, responsive to sensor data received from one or more sensors of an autonomous vehicle, one or more predicted trajectories are generated, with each of the predicted trajectories having an associated probability. One or more driving scenarios that trigger gesture recognition are identified. For each of the identified driving scenarios, one or more gestures from one or more vehicles are detected in accordance with a gesture detection protocol. One or more gestures from the autonomous vehicle for communication with the vehicles are emitted in accordance with a gesture emission protocol based on the detected gestures. The predicted trajectories are modified based on the detected gestures, the emitted gestures and the associated probabilities of the predicted trajectories. The autonomous vehicle is controlled based on the modified predicted trajectories.

Figure 1:
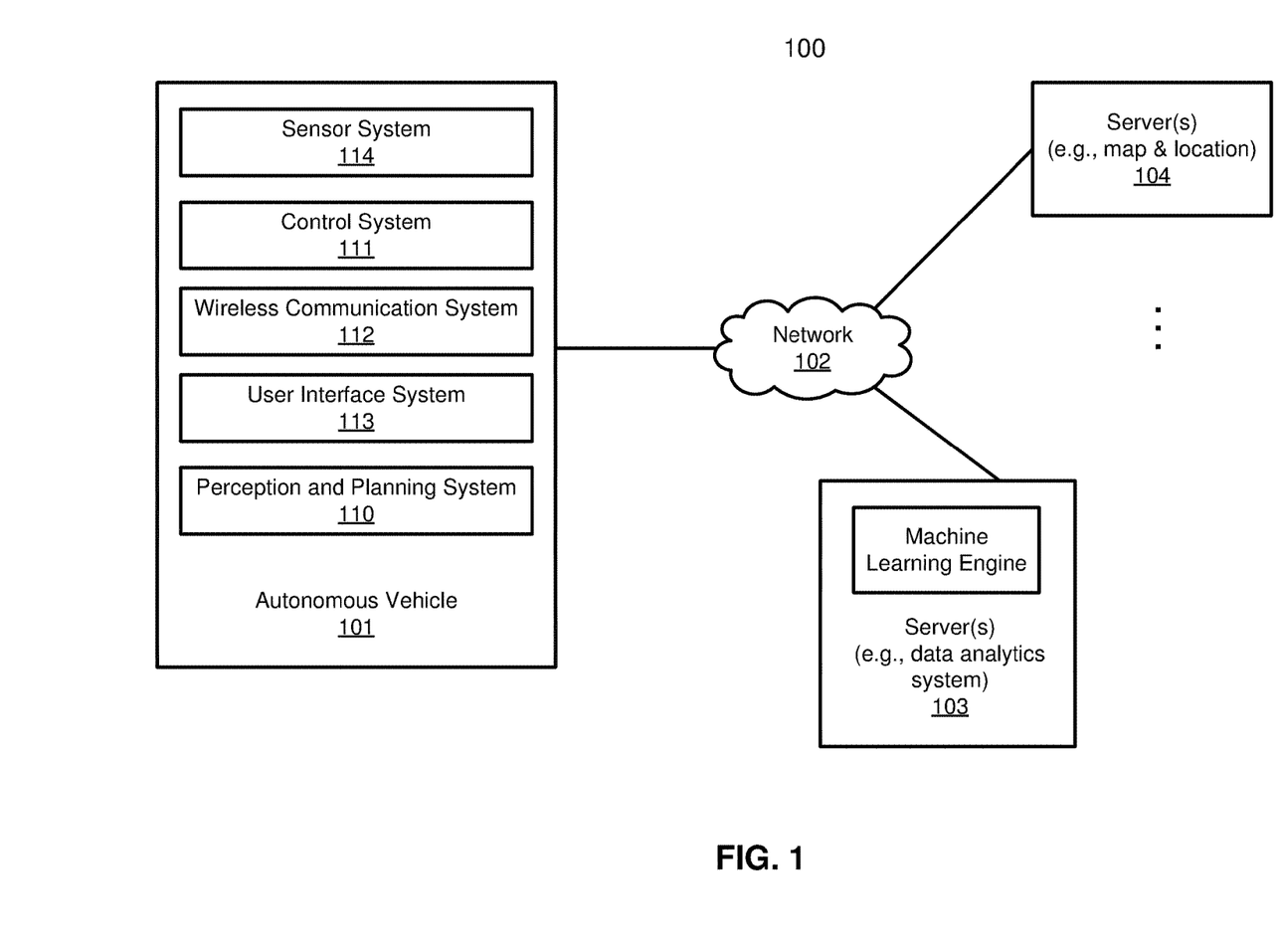
FIG. 1 is a block diagram illustrating a networked system according to one embodiment of the invention.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 114. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-114 may be communicatively coupled to each other via an interconnect, a bus, a network, or a combination thereof. For example, components 110-114 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
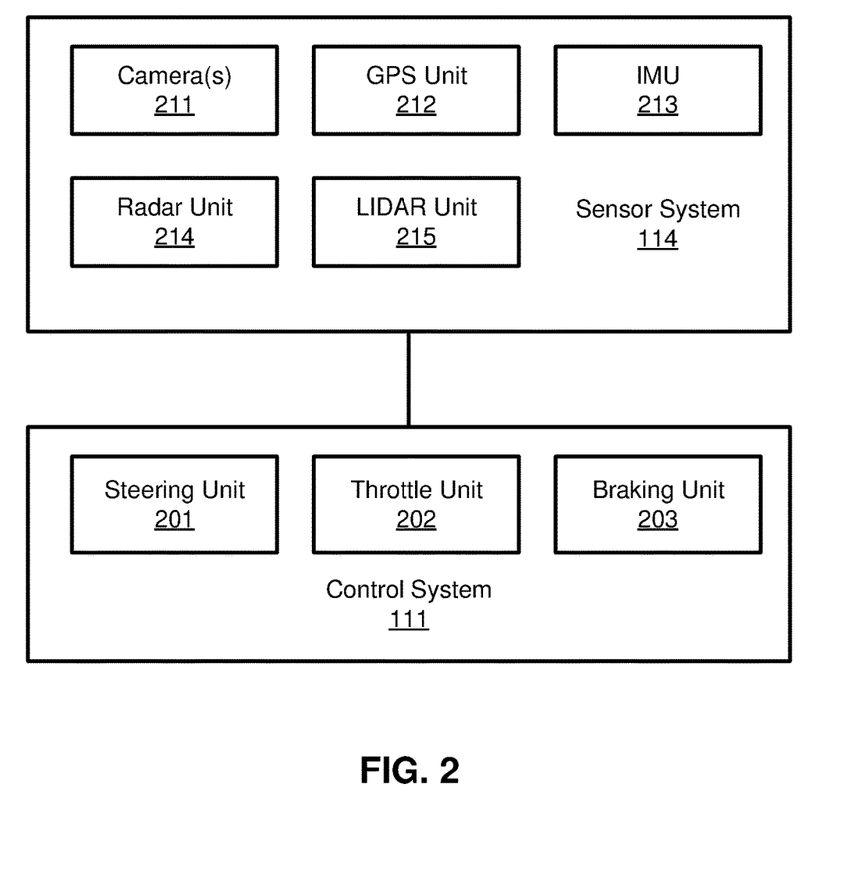
FIG. 2 is a block diagram illustrating an example of an autonomous vehicle according to one embodiment of the invention.

Referring now to FIG. 2, in one embodiment, sensor system 114 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 114 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 114, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 114 (e.g., obstacles, objects, nearby vehicles), perception and planning system 110 can plan an optimal route and drive vehicle 101, for example, via control system 111, according to the planned route to reach the specified destination safely and efficiently.

In one embodiment, in predicting traffic behavior of vehicle(s) within a driving environment, autonomous vehicle 101 receives sensor data from sensor system 114. One or more predicted trajectories of the vehicle(s) are generated based on the sensor data, each of the predicted trajectories having an associated probability. The autonomous vehicle 101 identifies a driving scenario that triggers gesture recognition, and for each of the identified driving scenarios, the autonomous vehicle 101 detects one or more gestures from the vehicle(s) in accordance with a gesture detection protocol. Based on the detected gestures, one or more gestures are emitted from the autonomous vehicle 101 in accordance with a gesture emission protocol. The predicted trajectories are modified based on the detected gestures, emitted gestures, and associated probabilities of the predicted trajectories.

The modification of the predicted trajectories includes removal of a first set of the predicted trajectories and shortening of a second set of the predicted trajectories. The first set, for example, are predicted trajectories having low associated probabilities and the second set are predicted trajectories having reasonable predicted trajectories. Using the modified trajectories, the autonomous vehicle 101 can make driving decisions such as to yield to or overtake the vehicle(s).

Figure 3:
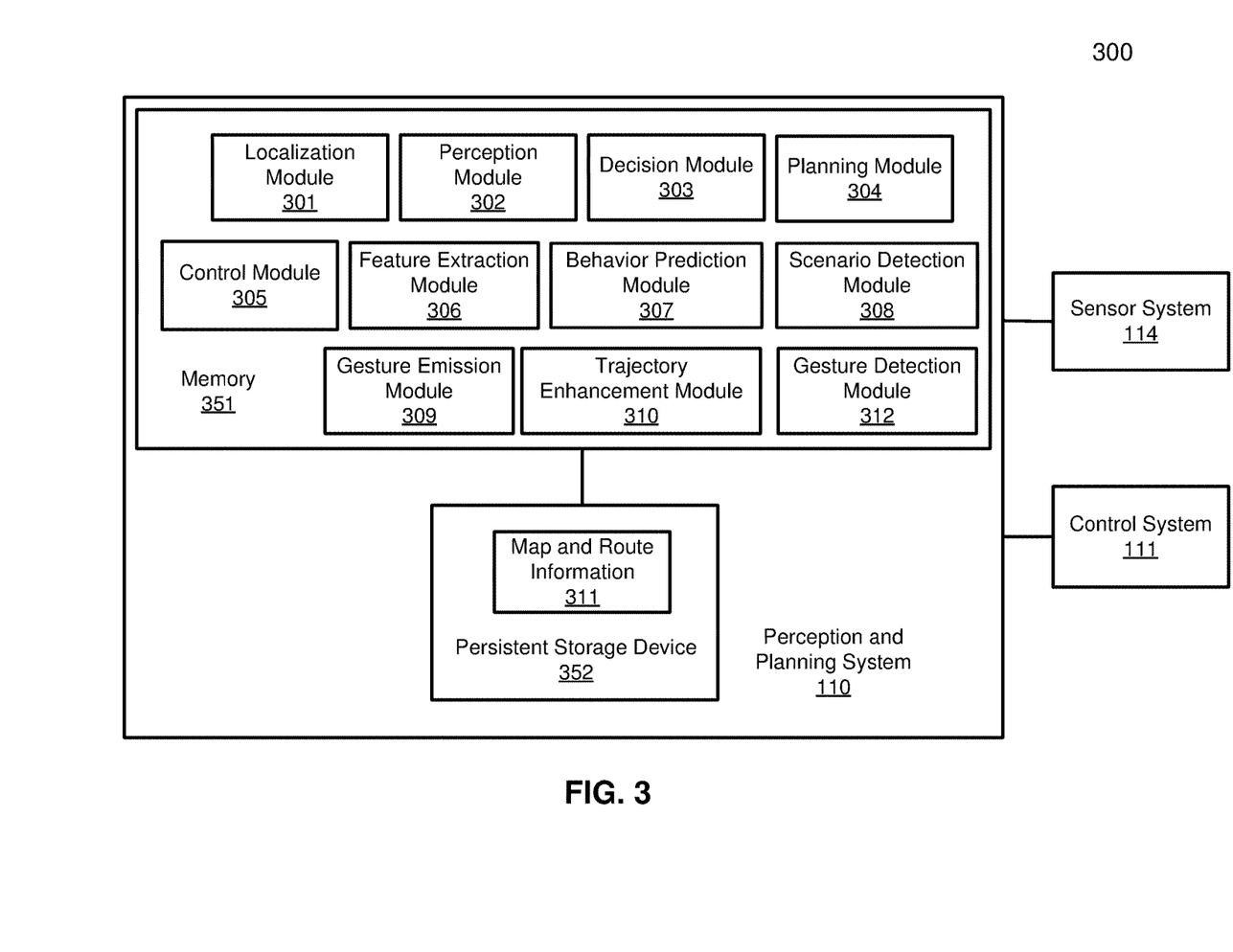
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 114. Referring to FIG. 3, perception and planning system 110 includes, but is not limited to, localization module 301, perception module 302, decision module 303, planning module 304, control module 305, feature extraction module 306, behavior prediction module 307, scenario detection module 308, gesture emission module 309, trajectory enhancement module 310, and gesture detection module 311.

Some or all of modules 301-311 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-311 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 312, to obtain the trip related data. For example, localization module 301 may obtain location and route information from a location server and a map and POI (MPOI) server. A location server provides location services and an MPOI server provides map services and the POIs of certain locations, which may be cached as part of map and route information 312. While autonomous vehicle 300 is moving along the route, localization module 301 may also obtain real-time traffic information from a traffic information system or server.

Based on the sensor data provided by sensor system 114 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

The feature extraction module 306 extracts sensor data from the sensor system 114 to construct data for the behavior prediction module 307. For example, the feature extraction module 306 may read or retrieve sensor data from the various sensors in the sensor system 114 and store the sensor data into a memory of the perception and planning system 110.

Based on the sensor data, the behavior prediction module 307 calculates and generates one or more predicted travel trajectories of another object such as a vehicle, a pedestrian, and/or a biker, with each of the predicted travel trajectories having an associated probability. The associated probability, for example, may be a likelihood or probability that the other vehicle or pedestrian will travel or walk in the predicted trajectory associated with the probability.

The scenario detection module 308 detects one or more driving scenarios where gesture recognition or interactive gesture-based communication is triggered. The driving scenarios, for example, may be a stop-controlled intersection, a crosswalk, or yield-controlled intersection.

When the interactive gesture based communication is triggered, the gesture detection module 311 is activated or invoked to detect one or more gestures from one or more vehicles (e.g., autonomous and/or non-autonomous vehicles) or pedestrians (e.g., hand waving). The detected gestures may include human gestures and/or signals received via a wireless interface (e.g., Wi-Fi, Bluetooth, or any other suitable wireless interface).

Based on the detected gesture(s), the gesture emission module 309 controls the emission of one or more gestures from the autonomous vehicle 101 to communicate with the vehicles. The emitted gestures, for example, may be a yield gesture for signaling another vehicle or pedestrian (or biker) to pass or an overtake gesture for notifying that the autonomous vehicle 101 is taking maneuver and requesting the other vehicle or pedestrian to yield.

The trajectory enhancement module 310 leverages the detected and emitted gestures, and refines the predicted travel trajectories produced by the behavior prediction module 307. For example, the trajectory enhancement module 310 may remove some of the predicted travel trajectories that are unlikely or improbable to occur, and maintain the more probable predicted travel trajectories or the ones having reasonable associated probabilities (e.g., greater than or equal to 30%, 40% or 50%).

Figure 4:
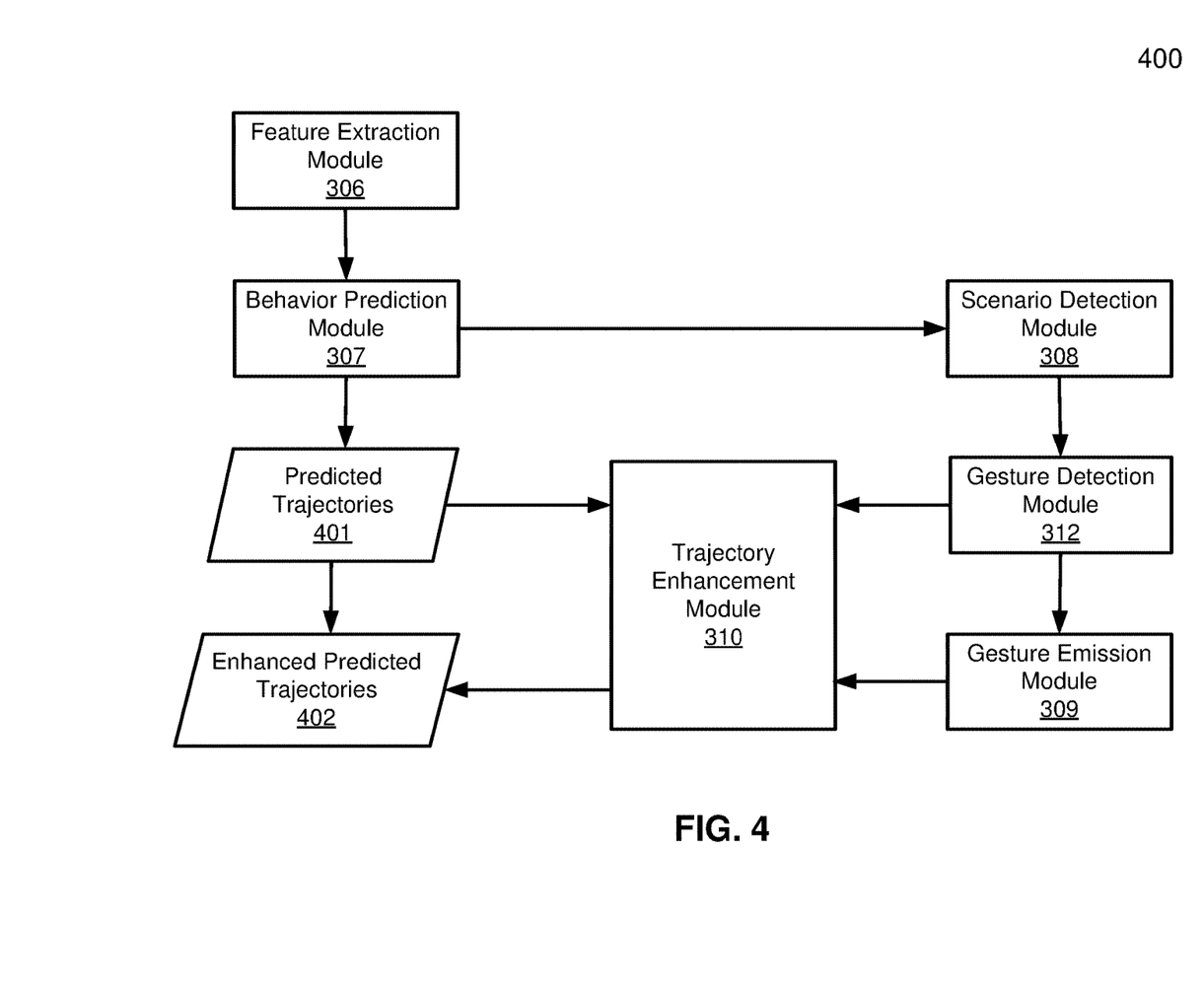
FIG. 4 is a block diagram illustrating an example of operating an autonomous vehicle according to one embodiment of the invention.

FIG. 4 is a block diagram illustrating an example of operating an autonomous vehicle according to one embodiment of the invention. In FIG. 4, the feature extraction module 306 is invoked to extract sensor data, for example in real-time, from a variety of sensors mounted on the autonomous vehicle 101. The sensor data may include a speed, direction or heading, current location of the autonomous vehicle 101, and lane and junction information (e.g., a stop sign, yield sign, merger sign, traffic light).

Based on the sensor data and pre-built machine learning models, for example constant yaw rate and acceleration (CYRA) motion model and/or maneuver recognition model (MRM), the behavior prediction module 307 calculates and outputs one or more predicted trajectories 401 of another moving object (e.g., vehicle, pedestrian, biker). Each of the predicted trajectories 401 may include an associated probability that represents a likelihood that the other moving object will travel within the predicted trajectory.

Subsequent to the behavior prediction module 307, the scenario detection module 308 is invoked to identify one or more driving scenarios that trigger gesture recognition. For example, the scenario detection module 308 may identify an object within the driving environment that is indicative of a scenario that triggers or requires gesture recognition. In some embodiments, the object may be a stop sign, which indicates a stop-controlled intersection where vehicles, for example, may arrive simultaneously.

If at least one scenario that triggers gesture recognition is identified, the gesture detection module 311, for each of the identified driving scenarios, detects one or more gestures from one or more vehicles (e.g., vehicles within the stop-controlled intersection) in accordance with a gesture detection protocol. In some embodiments, the gestures may be human gestures (e.g., human hand motions) or signals received wirelessly from the vehicles (e.g., another autonomous vehicle). In some embodiments, the gestures are detected by way of one or more cameras (e.g., cameras 211) and software or middleware that executes computer vision algorithms such as spatial gesture algorithms, which may include 3D model-based and/or appearance-based algorithms. In some embodiments, the gesture detection protocol may include a predefined set of values (e.g., enumerated values), with each value corresponding to a particular gesture (e.g., overtake, yield).

The gesture emission module 309 controls or commands the autonomous vehicle 101 to emit one or more gestures for communication with the other vehicles in accordance with a gesture emission protocol in response to the detected gestures. In some embodiments, the gesture emission module 309 may command the autonomous vehicle 101 to emit a yield gesture if the detected gesture is an overtake gesture. Alternatively, the gesture emission module 309 may command the autonomous vehicle 101 to emit an overtake gesture if the detected gesture is a yield gesture. In some embodiments, if a gesture is undetected or unrecognized, the gesture emission module 309 may also command the autonomous vehicle 101 to emit the yield gesture to signal the other vehicles to pass or overtake, thereby complying with the "safety first" rule incorporated within autonomous driving.

The gestures, for example, may be emitted in several ways such as audio (e.g., speakers), video (e.g., via an external display device having a flat or curved screen mounted on the autonomous vehicle 101), a physical sign mounted on or coupled to (e.g., by way of an arm) to the autonomous vehicle 101, human gesture imitation (e.g., humanoid robot arm), augmented reality-based human gestures, and/or a wireless signal transmission (e.g., to another autonomous vehicle). In some embodiments, the gesture emission protocol may include a predefined set of values (e.g., enumerated values), with each value corresponding to a particular emitted gesture.

The detected gestures, emitted gestures, and predicted trajectories 401 are provided to the trajectory enhancement module 310 to enhance or refine the predicted trajectories 401 and generate enhanced predicted trajectories 402. For example, leveraging the detected and emitted gestures, the trajectory enhancement module 310 may modify the predicted trajectories 401 by deleting some of the unlikely ones (e.g., the predicted trajectories having low associated probabilities such as less than 30%, 40% or 50%) and maintain or select the more probable ones using, for example, a hidden Markov model. In some embodiments, based on the emitted gestures, the trajectory enhancement module 310 may shorten or lengthen some of the predicted trajectories 401 by timestamping each of the predicted trajectories with a timestamp indicative of a time the other vehicle, for example, will yield or overtake respectively. Accordingly, for example, from the perspective of the autonomous vehicle 101, emitting a yield gesture may result in a shorter planned trajectory and emitting an overtake gesture may result in a longer planned trajectory for the autonomous vehicle 101.

Figure 5:
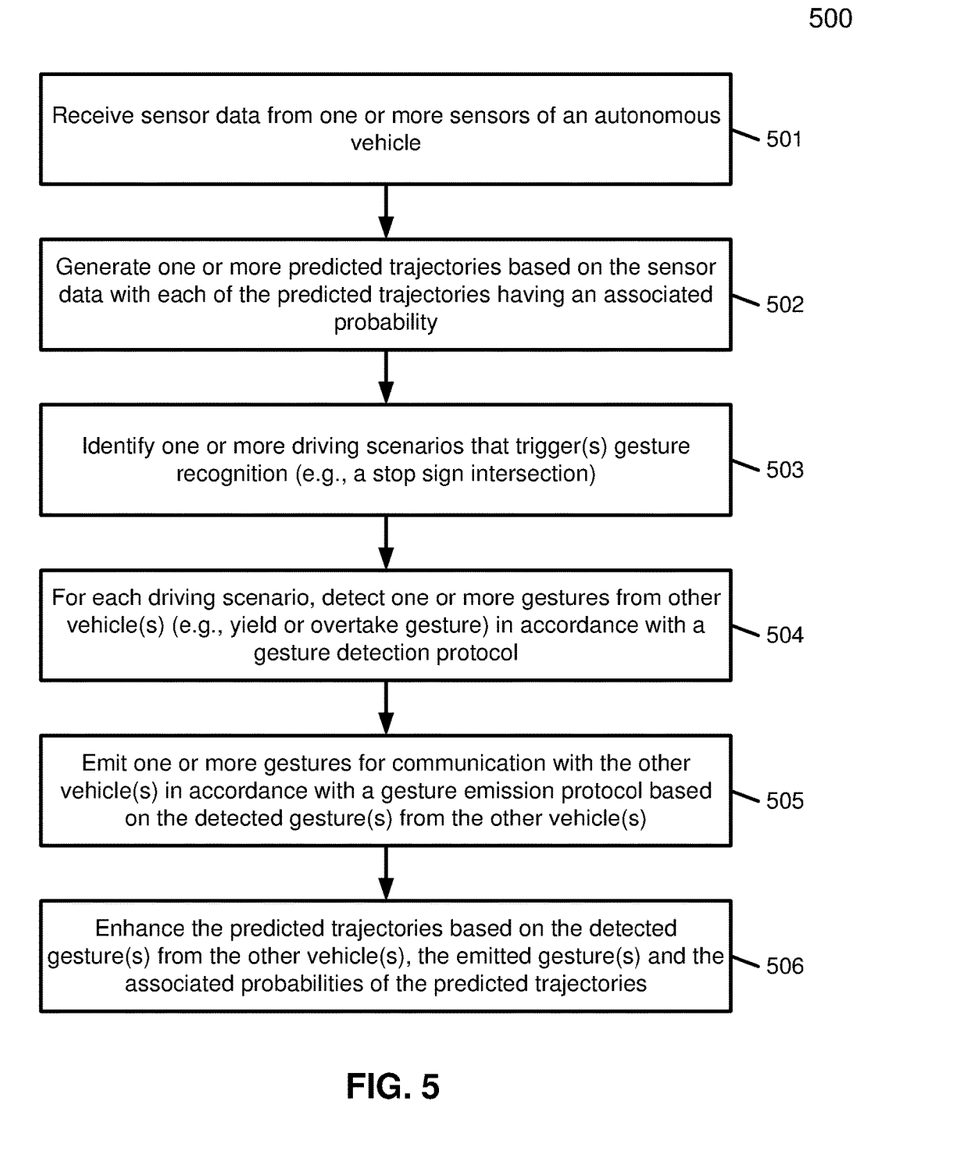
FIG. 5 is a flow diagram illustrating a process of operating an autonomous vehicle according to one embodiment of the invention.

FIG. 5 is a flow diagram illustrating a process of operating an autonomous vehicle according to one embodiment of the invention. Process 500 may be performed by processing logic which may include software, hardware, or a combination thereof. For example, process 500 may be performed by the perception and planning system 110 of FIG. 1. Referring to FIG. 5, at block 501, the processing logic receives sensor data from one or more sensors of an autonomous vehicle (e.g., autonomous vehicle 101). At block 502, the processing logic generates one or more predicted trajectories based on the sensor data, with each of the predicted trajectories having an associated probability. At block 503, the processing logic identifies one or more driving scenarios that trigger(s) gesture recognition (e.g., a stop sign intersection). For each driving scenario, at block 504, the processing logic detects one or more gestures from other vehicle(s) (e.g., yield or overtake gesture) in accordance with a gesture detection protocol. At block 505, the processing logic emits one or more gestures for communication with the other vehicle(s) in accordance with a gesture emission protocol based on the detected gesture(s) from the other vehicle(s). At block 506, the processing logic enhances the predicted trajectories based on the detected gesture(s) from the other vehicle(s), the emitted gesture(s) and the associated probabilities of the predicted trajectories.

Figure 6A:
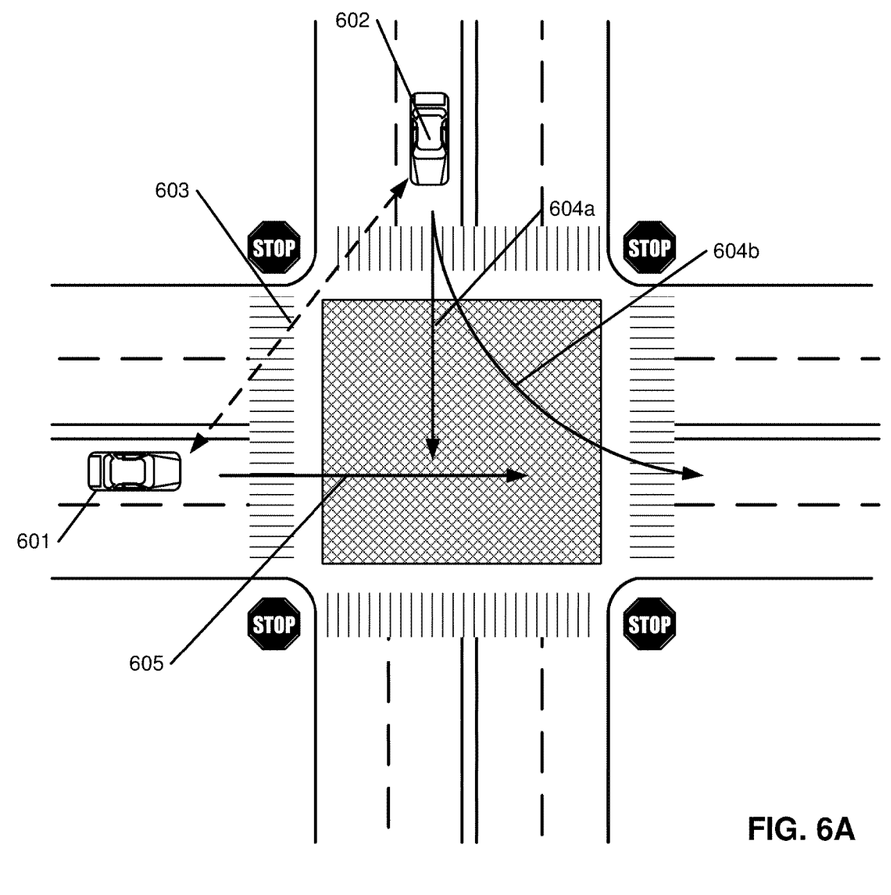
FIGS. 6A and 6B illustrate an example of a driving scenario according to one embodiment of the invention.
Figure 6B:
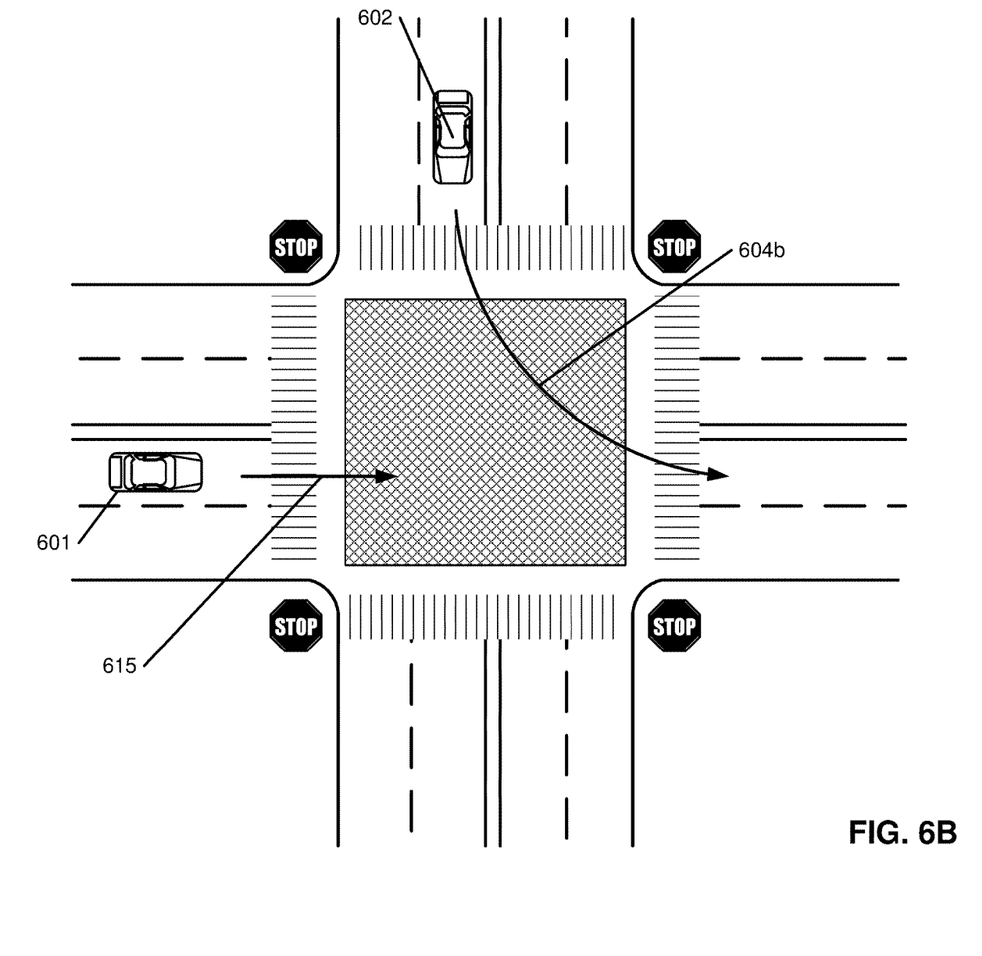

FIGS. 6A and 6B illustrate an example of a driving scenario according to one embodiment of the invention. Referring to FIG. 6A, in this example, a first vehicle 601 (e.g., autonomous vehicle 101), which may be referred to as "master vehicle," and a second vehicle 602, which may be referred to as "other vehicle," arrive at a stop sign intersection at or approximately the same time. In this case, the master vehicle may compute and generate two predicted trajectories of the other vehicle: a through trajectory 604a and a left turn trajectory 604b, with both trajectories intervening with a planned trajectory 605 of the master vehicle. The master vehicle may then identify one or more driving scenarios that trigger gesture recognition (e.g., by invoking the scenario detection module 308). Since this example is a stop sign intersection, a driving scenario that triggers gesture recognition is identified. Subsequently, the master vehicle may detect one or more gestures from the other vehicle via a gesture path 603 (e.g., by invoking the gesture detection module 311). If the master vehicle does not detect any gestures, or detects an unrecognized or overtake gesture, the master vehicle therefore emits a yield gesture via the gesture path 603. Leveraging on the emitted gesture, the master vehicle may modify the planned trajectory 605 and produce a shorter planned trajectory 615, as shown in FIG. 6B, thereby yielding to or allowing the other vehicle to take on, for example, the left turn trajectory 604b prior to maneuvering.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
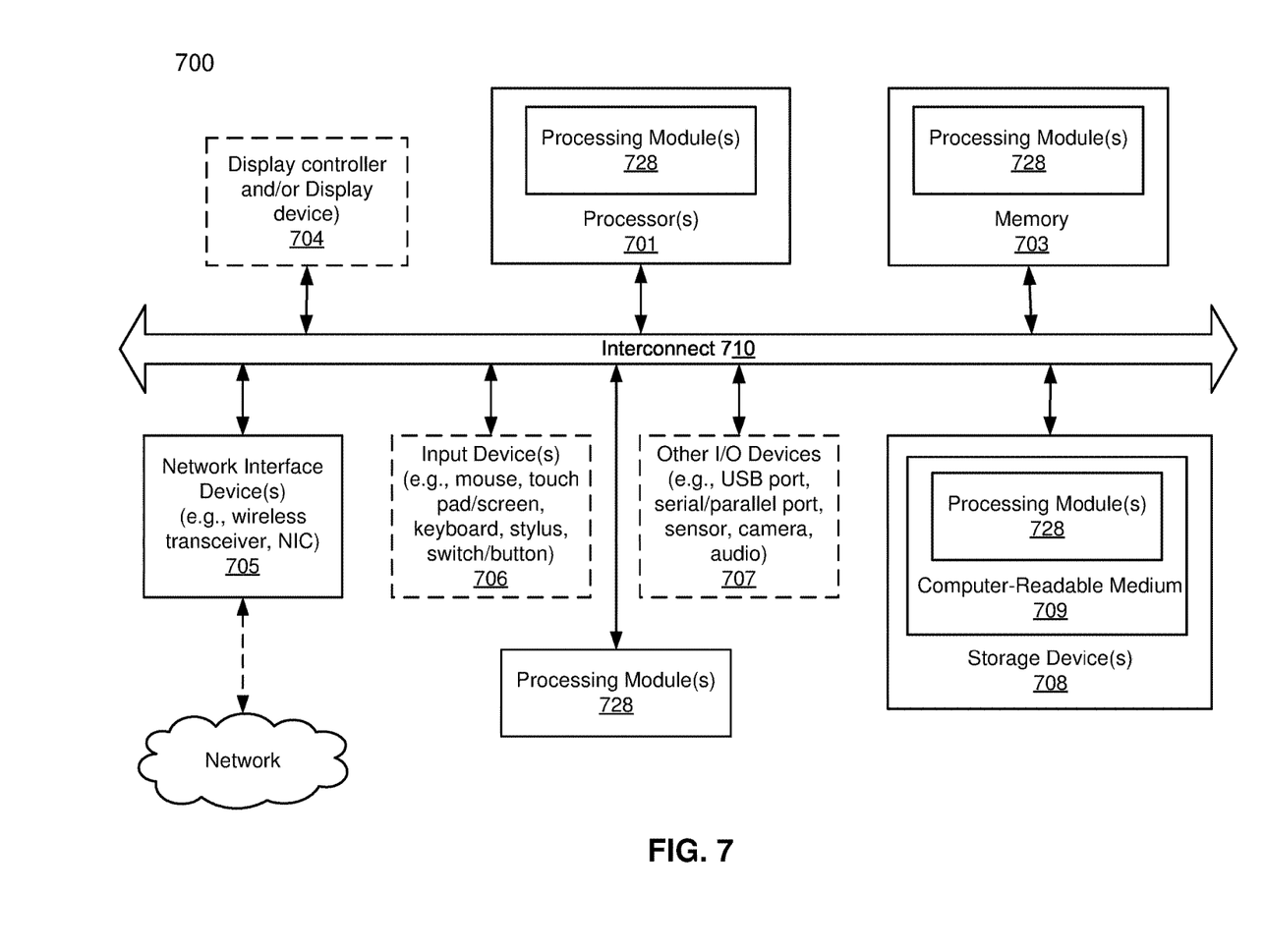
FIG. 7 is a block diagram illustrating a data processing system according to one embodiment.

FIG. 7 is a block diagram illustrating an example of a data processing system which may be used with one embodiment of the invention. For example, system 700 may represent any of data processing systems described above performing any of the processes or methods described above, such as, for example, perception and planning system 110 or any of servers 103-104 of FIG. 1. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations and steps discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 700 may further include IO devices such as devices 705-708, including network interface device(s) 705, optional input device(s) 706, and other optional IO device(s) 707. Network interface device 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with display device 704), a pointer device such as a stylus, and/or a keyboard (e.g., physical keyboard or a virtual keyboard displayed as part of a touch sensitive screen). For example, input device 706 may include a touch screen controller coupled to a touch screen. The touch screen and touch screen controller can, for example, detect contact and movement or break thereof using any of one or more touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including BIOS as well as other firmware of the system.

Storage device 708 may include computer-accessible storage medium 709 (also known as a machine-readable storage medium or a computer-readable medium) on which is stored one or more sets of instructions or software (e.g., module, unit, and/or logic 728) embodying any one or more of the methodologies or functions described herein. Processing module/unit/logic 728 may represent any of the components described above, such as, for example, planning module 304, control module 305, or any of the modules 306-311 (alone or in combination). Processing module/unit/logic 728 may also reside, completely or at least partially, within memory 703 and/or within processor 701 during execution thereof by data processing system 700, memory 703 and processor 701 also constituting machine-accessible storage media. Processing module/unit/logic 728 may further be transmitted or received over a network via network interface device 705.

Computer-readable storage medium 709 may also be used to store the some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
    generating one or more predicted trajectories based on sensor data received from one or more sensors of the autonomous vehicle, each of the predicted trajectories being associated with a probability;
    detecting one or more gestures from one or more vehicles other than the autonomous vehicle in accordance with a gesture detection protocol;
    emitting one or more gestures from the autonomous vehicle to communicate with the one or more vehicles in accordance with a gesture emission protocol based on the detected gestures;
    modifying the predicted trajectories based on the detected gestures, the emitted gestures, and the associated probabilities of the predicted trajectories; and
    controlling the autonomous vehicle based on the modified predicted trajectories.

2. The method of claim 1, wherein modifying the predicted trajectories includes removing a first set of trajectories from the predicted trajectories and producing a second set of trajectories.

3. The method of claim 2, wherein producing the second set of trajectories includes timestamping each trajectory in the second set of trajectories based on the detected one or more gestures.

4. The method of claim 2, wherein trajectories in the first set of trajectories have lower associated probabilities than trajectories in the second set of trajectories.

5. The method of claim 1, wherein the one or more vehicles are non-autonomous vehicles, and wherein the one or more detected gestures from the one or more vehicles are human hand motions.

6. The method of claim 1, wherein the emitted one or more gestures is an overtake gesture when the detected one or more gestures is a yield gesture, and wherein the emitted one or more gestures is a yield gesture when the detected one or more gestures is an overtake gesture or an unrecognized gesture.

7. The method of claim 1, wherein the gesture detection protocol and the gesture emission protocol include a predefined set of values, each of the values corresponding to a particular gesture.

8. The method of claim 1, wherein the one or more vehicles are other autonomous vehicles, and wherein detecting the one or more gestures from the one or more vehicles comprises wirelessly receiving one or more signals indicative of the detected one or more gestures from the other autonomous vehicles.

9. A non-transitory machine-readable medium having instructions stored therein, which when executed by a processor, cause the processor to perform operations, the operations comprising:
  generating one or more predicted trajectories based on sensor data received from one or more sensors of an autonomous vehicle, each of the predicted trajectories being associated with a probability;
  detecting one or more gestures from one or more vehicles other than the autonomous vehicle in accordance with a gesture detection protocol;
  emitting one or more gestures from the autonomous vehicle to communicate with the one or more vehicles in accordance with a gesture emission protocol based on the detected gestures;
  modifying the predicted trajectories based on the detected gestures, the emitted gestures, and the associated probabilities of the predicted trajectories; and
  controlling the autonomous vehicle based on the modified predicted trajectories.

10. The machine-readable medium of claim 9, wherein modifying the predicted trajectories includes removing a first set of trajectories from the predicted trajectories and producing a second set of trajectories.

11. The machine-readable medium of claim 10, wherein producing the second set of trajectories includes timestamping each trajectory in the second set of trajectories based on the detected one or more gestures.

12. The machine-readable medium of claim 10, wherein trajectories in the first set of trajectories have lower associated probabilities than trajectories in the second set of trajectories.

13. The machine-readable medium of claim 9, wherein the one or more vehicles are non-autonomous vehicles; and the one or more gestures from the vehicles are human hand motions.

14. The machine-readable medium of claim 9, wherein the emitted one or more gestures is an overtake gesture when the detected one or more gestures is a yield gesture; and wherein the emitted one or more gestures is a yield gesture when the detected one or more gestures is an overtake gesture or an unrecognized gesture.

15. The machine-readable medium of claim 9, wherein the gesture detection protocol and the gesture emission protocol include a predefined set of values, each of the values corresponding to a particular gesture.

16. The machine-readable medium of claim 9, wherein the one or more vehicles are other autonomous vehicles; and wherein detecting the one or more gestures from the one or more vehicles comprises wirelessly receiving one or more signals indicative of the detected one or more gestures from the other autonomous vehicles.

17. A data processing system, comprising:
  a processor; and
  a memory coupled to the processor to store instructions, which when executed by the processor, cause the processor to perform operations, the operations including:
    generating one or more predicted trajectories based on sensor data received from one or more sensors of an autonomous vehicle, each of the predicted the predicted trajectories being associated with a probability,
    detecting one or more gestures from one or more vehicles other than the autonomous vehicle in accordance with a gesture detection protocol,
    emitting one or more gestures from the autonomous vehicle to communicate with the one or more vehicles in accordance with a gesture emission protocol based on the detected gestures,
    modifying the predicted trajectories based on the detected gestures, the emitted gestures, and the associated probabilities of the predicted trajectories, and
    controlling the autonomous vehicle based on the modified predicted trajectories.

18. The system of claim 17, wherein modifying the predicted trajectories includes removing a first set of trajectories from the predicted trajectories and producing a second set of trajectories.

19. The system of claim 18, wherein producing the second set of trajectories includes timestamping each trajectory in the second set of trajectories based on the detected one or more gestures.

20. The system of claim 18, wherein trajectories in the first set of trajectories have lower associated probabilities than trajectories in the second set of trajectories.

21. The system of claim 17, wherein the one or more vehicles are non-autonomous vehicles; and the one or more gestures from the vehicles are human hand motions.

22. The system of claim 17, wherein the emitted one or more gestures is an overtake gesture when the detected one or more gestures is a yield gesture; and wherein the emitted one or more gestures is a yield gesture when the detected one or more gestures is an overtake gesture or an unrecognized gesture.

23. The system of claim 17, wherein the gesture detection protocol and the gesture emission protocol include a predefined set of values, each of the values corresponding to a particular gesture.

24. The system of claim 17, wherein the one or more vehicles are other autonomous vehicles; and wherein detecting the one or more gestures from the one or more vehicles comprises wirelessly receiving one or more signals indicative of the detected one or more gestures from the other autonomous vehicles.

* * * * *